Figure 1:
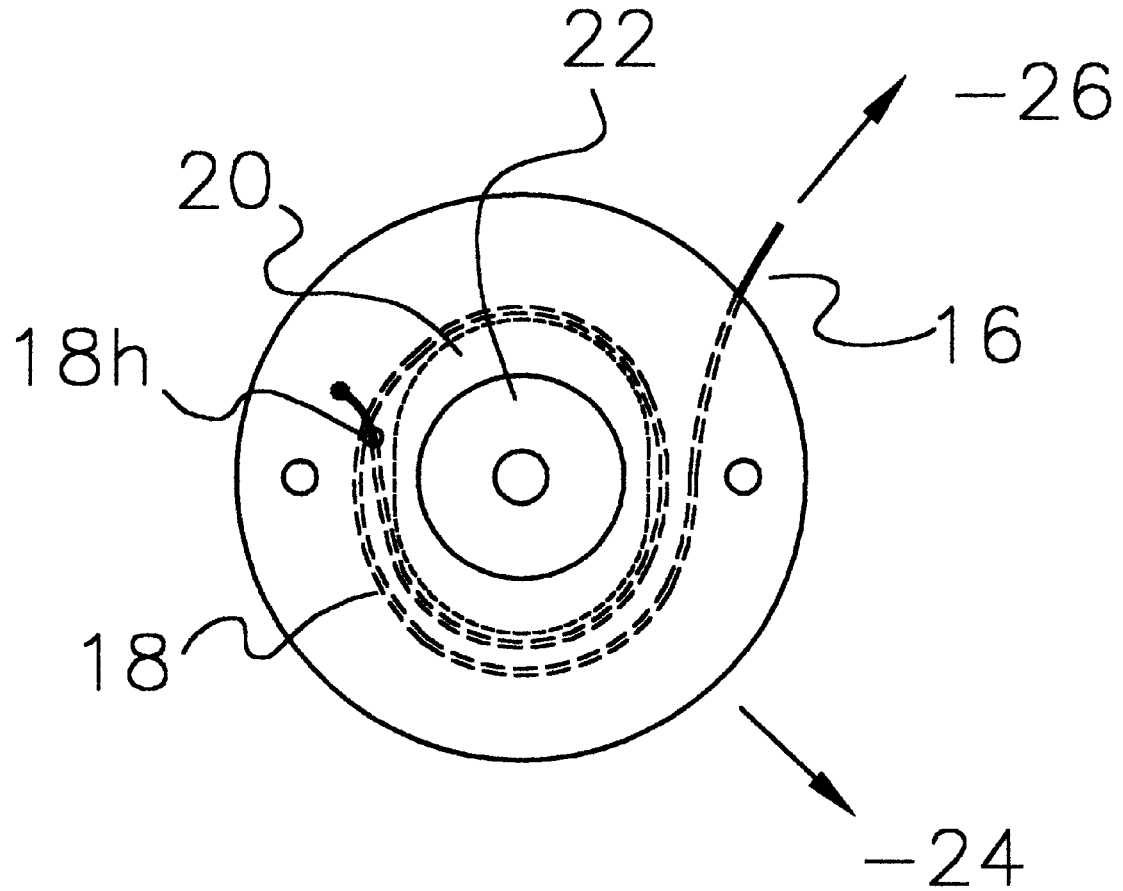

United States Patent
Wood

[11] Patent Number: 6,035,511
[45] Date of Patent: Mar. 14, 2000

[54] STRING TRIMMER HEAD WITH OPPOSING CENTRIFUGAL FORCES FILAMENT FEED

[76] Inventor: Thomas E. Wood, P.O. Box 1317, Dripping Springs, Tex. 78620-1317

[21] Appl. No.: 09/184,662

[22] Filed: Nov. 2, 1998

Related U.S. Application Data

[63] Continuation of application No. 08/937,696, Sep. 29, 1997, abandoned.

[51] Int. Cl.[7] .................................................. B26B 27/00
[52] U.S. Cl. .................................. 29/434; 30/347; 30/276
[58] Field of Search ....................... 30/276, 347; 56/12.7, 56/12.5; 29/434

[56] References Cited

U.S. PATENT DOCUMENTS

| | | | |
|---|---|---|---|
| 4,236,312 | 12/1980 | Lombard | 30/276 |
| 4,285,127 | 8/1981 | Zerrer | 30/276 |
| 4,290,200 | 9/1981 | Lombard | 30/276 |
| 4,347,666 | 9/1982 | Moore | 30/276 |
| 4,366,621 | 1/1983 | Mitchell | 30/276 |
| 4,366,622 | 1/1983 | Lombard | 30/276 |
| 4,483,069 | 11/1984 | Moore | 30/276 |
| 4,561,180 | 12/1985 | Pittinger | 30/276 |
| 4,571,831 | 2/1986 | White, III | 30/276 |
| 4,756,146 | 7/1988 | Rouse | 30/347 |
| 4,835,867 | 6/1989 | Foster et al. | 30/276 |
| 4,852,258 | 8/1989 | Foster | 30/276 |
| 5,303,476 | 4/1994 | Tuggle | 30/347 |
| 5,615,543 | 4/1997 | Caffey et al. | 30/347 |
| 5,659,964 | 8/1997 | Lawrence | 30/347 |

*Primary Examiner*—Rinaldi I. Rada
*Assistant Examiner*—Omar Flores-Sánchez

[57] ABSTRACT

A rotating spool with walls (10t and 10b) so close together that the cutting filament (18) cannot wrap over on top of itself. The spool has flail anchors (14) at the spool walls' (10t and 10b) periphery. A spacer (20) between spool walls has the filament (18) wound on to it and is so shaped that the filament (18) has a larger distance from center of rotation between flail anchors (14) than it has nearest the flail anchors (14). The filament (18) is loaded onto the spool by inserting one end of the filament (18) into the loading hole (18h) until it emerges from between spool walls (10t and 10b), then drawn taut, then laced inside flail anchors (14) until the filament (18) is wound up on the spacer (20). And the flail (16) is ready to cut vegetation.

5 Claims, 1 Drawing Sheet

STRING TRIMMER HEAD WITH OPPOSING CENTRIFUGAL FORCES FILAMENT FEED

BACKGROUND—FIELD OF INVENTION

This application is a continuation of application Ser. No. 08/937,696, filing date Sep. 29, 1997; now abandoned with identical title, and relates to string trimmer heads that use flexible filament to cut vegetation; and the use of opposing centrifugal forces on the filament and its flail to feed filament to the flail. Applicant specifically claims the filing date Sep. 29, 1997.

BACKGROUND—DESCRIPTION OF PRIOR ART

In the past twenty or so years, hand-held string trimmers using flexible and expendable filament have become very common. Many patents have been issued for devices that store and feed out filament, mainly the familiar bump feed heads, plus heads that automatically feed out cord with very limited operator influence.

Among the heads that automatically feed out filament almost independently of operator control, research has identified these:

| | |
|---|---|
| 4,561,180 (1985) to Pittinger | Bump feed to incrementally feed the flail |
| 4,236,312 (1980) to Lombard and Foster | Electric motor maintains constant flail length |
| 4,285,127 (1981) to Zerrer | Speed actuates cams |
| 4,290,200 (1981) to Lombard | Speed actuates a cam |
| 4,347,666 (1982) to Moore | Speed actuates a cam |
| 4,366,621 (1983) to Mitchell | Speed actuates a cam |
| 4,366,622 (1983) to Lombard | Speed actuates a cam |
| 4,483,069 (1984) to Moore | Speed actuates a cam |
| 4,835,867 (1989) to Foster, Collings and Stuart | Speed actuates a cam |
| 4,852,258 (1989) to Foster | Speed actuates a cam |

Trimmer heads using the principles described in these patents have moving parts which collect grit and grime and very often fail to function acceptably or to function at all. These heads also have spools on which the cutting filament wraps over on top of itself, then refuses to feed, a very common problem with the bump feed heads too.

The market for heads with manually-installed flails will remain good until a trimmer head that feeds dependably—with few or no malfunctions—comes on the market.

OBJECTS AND ADVANTAGES (a) This patent application describes a very simple device, a spool with closely-spaced walls that won't allow filament to wrap over on top of itself and then refuse to feed.

(b) The only moving part in the trimmer head is the filament. There are no springs, ratchets, pawls, cam or cup. Lack of moving parts means that dust, grime, dirt, etc. will not easily disable this device.

(c) An operator can easily reload the spool with filament without any disassembly of the trimmer head. All he has to do is to pull out the remainder of the used filament from the filament loading hole and then insert the end of a pre-cut length of filament into the loading hole, push it in until the end emerges from between spool walls, then draw it out until the other end stops at the loading hole, then lace the filament inside the flail anchors until it is all wound up. No tools are required.

(d) The spool can be so built that the filament will wind up on the spool in either direction, with the direction of rotation or against it. The preferred choice is to wind the filament with the direction of rotation.

(e) This device is simpler and cheaper to produce than all other types except those with manually installed flails.

REFERENCE NUMBERS IN THE DRAWING FIGURES

Figure 2:
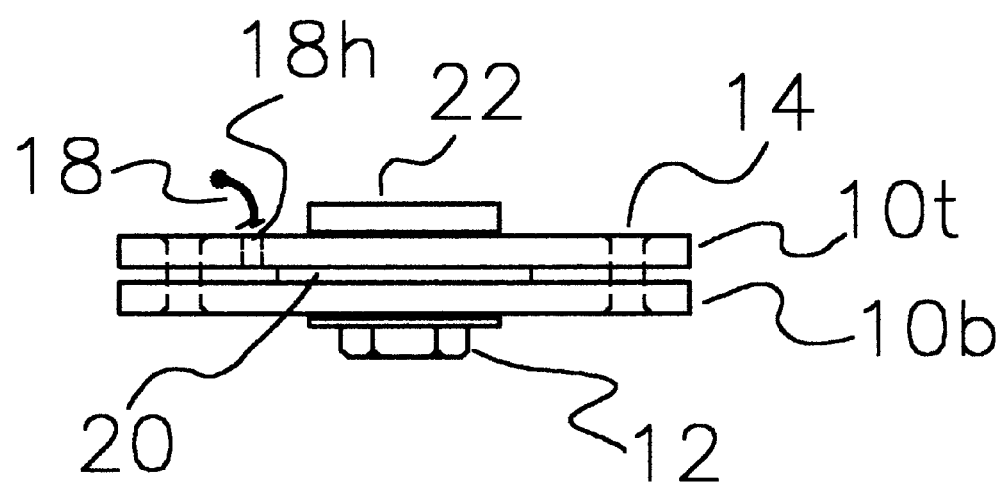

FIG. 1 Top plan view of the spool
FIG. 2 Elevation of the spool
10t Top Spool Wall
10b Bottom Spool Wall
12 Mounting Arbor
14 Flail Anchor
16 Flail
18 Inside Filament
18h Slanted Filament Loading Hole in the top Spool Wall 10t
20 Spacer Between Spool Walls 10b and 10t
22 Bottom of Trimmer Drive Train
-24 Centrifugal Force Vector on the Filament
-26 Centrifugal Force Vector on the Flail

SUMMARY

This invention comprises a spool with close spool walls mounted on an arbor; flail anchors connecting spool walls at their periphery; a elliptically shaped spacer of special shape between spool walls, on which spacer a filament is wound, a filament loading hole in at least one spool wall, and means of anchoring the filament onto the spool.

Description

A typical material for the spool walls 10t and 10b and the spacer 20 is polyvinyl chloride or a polycarbonate, or anything else suitable. The whole spool can be cast in two pieces, then machined as necessary. One of the spool walls, typically the top spool wall 10t, has a slanted filament loading hole 18h to allow insertion of a pre-cut length of filament which can be drawn from between spool walls 10t and 10b, then threaded inside the flail anchors 14, then wound up on the spacer 20.

Operation

When the trimmer head is in operation, it will not feed filament 18 to the flail 16 until the centrifugal force vector -24 on the filament 18 is greater than the centrifugal force vector -26 on the flail 16. When the flail 16 is short enough, filament 18 will "suck in" flail 16, which then slings out ahead of the flail anchor 14. The flail 16 is then longer because part of the filament 18 has joined it. The next in line flail anchor then anchors the newly-lengthened flail. The feeding process can be hastened by slapping the flail against a convenient object, thus reducing its radius of gyration, thus the force vector -26, but only when the flail is short enough.

Conclusions, Ramifications and Scope

This trimmer head is nothing more than a spool with close spool walls that won't let trimmer cord wrap over on top of itself and thus refuse to feed; that has a convenient way of loading the trimmer cord; that feeds filament to the flail only when the dynamics are correct; that has only one moving part—the filament; and can be readily used on practically any trimmer machine. The principle of operation can readily adapt to more powerful trimmers, to lawn mowers and brush hogs.

The larger machines can use "stacked" spools, i.e., a plurality of spool walls to accommodate more than one cutting cord.

Construction and operation are simple enough for practically anybody. And with only one moving part, the device will have few malfunctions, thus keeping downtime and repair costs to a minimum. The ordinary housewife, working in her yard, won't have to visit a repair shop very often because of this device.

I claim:

1. A method of operating a self feeding filament string trimmer head comprising the steps of:

(a) forming a trimmer head from first and second circular plates separated by a smaller dimensioned elliptical spacer attached therebetween, said plates including first and second flail anchors mounted between said plates at 180° points about the periphery thereof away from said spacer;

(b) attaching said head to a trimmer with an axle at concentric, aligned holes through said plates and said spacer;

(c) winding a filament string about said spacer between said plates;

(d) spinning said head so that the natural centrifugal forces acting upon said string cause said string to feed against said first, and then said second flail anchors as said string shortens through trim cutting action.

2. A self feeding filament string trimmer head for a string trimmer comprising:

a spool having first and second opposing circular plates each having a concentric hole to accommodate an axle for mounting said spool to a trimmer;

an elliptically shaped spacer substantially smaller at its greatest dimension than said plates and also having a concentric holes, said spacer having a predetermined thickness and attached between said first and second plates with said holes aligned for separating said plates by said predetermined thickness;

first and second flail anchors mounted near the periphery of said plates at 180° points between said plates beyond said spacer; and an attaching means on one of said plates near said spacer for attaching a filament string for winding around said spacer;

whereby said filament string wound upon said spacer between said plates will, by centrifugal force, alternately self feed against said first and then said second flail anchor as said filament string shortens through trim cutting action.

3. The trimmer head of claim 2 wherein said predetermined thickness of said spacer equals slightly greater than the diameter of said filament string.

4. The trimmer head of claim 2 wherein said plates and spacer are contructed of a polycarbonate or similar such non-breakable material.

5. The trimmer head claim 2 wherein said attaching means comprises a slanted hole having a diameter slightly larger than said filament string bored into said one of said plates.

\* \* \* \* \*